(12) United States Patent
Kapoor

(10) Patent No.: US 9,229,929 B2
(45) Date of Patent: Jan. 5, 2016

(54) MODULAR TRANSLATION OF LEARNING APPLICATIONS IN A MODULAR LEARNING SYSTEM

(75) Inventor: Samridh Kapoor, Mumbai (IN)

(73) Assignees: Monk Akarshala Inc., Sacramento, CA (US); Monk Akarshala Design Private Limited, Mumbai (IN)

(*) Notice: Subject to any disclaimer, the term of this patent is extended or adjusted under 35 U.S.C. 154(b) by 23 days.

(21) Appl. No.: 14/344,374

(22) PCT Filed: Sep. 13, 2012

(86) PCT No.: PCT/US2012/054960
§ 371 (c)(1),
(2), (4) Date: Mar. 12, 2014

(87) PCT Pub. No.: WO2013/040107
PCT Pub. Date: Mar. 21, 2013

(65) Prior Publication Data
US 2014/0343919 A1    Nov. 20, 2014

(30) Foreign Application Priority Data
Sep. 13, 2011   (IN) .......................... 2597/MUM/2011

(51) Int. Cl.
*G06F 17/20* (2006.01)
*G06F 17/28* (2006.01)
*G06F 9/44* (2006.01)
*G06N 5/00* (2006.01)

(52) U.S. Cl.
CPC ............ *G06F 17/289* (2013.01); *G06F 9/4448* (2013.01); *G06F 17/28* (2013.01); *G06N 5/00* (2013.01)

(58) Field of Classification Search
CPC ... G06F 17/289; G06F 17/2818; G06F 17/28; G06F 9/4448; G06F 17/2872; G06F 17/275; G06F 17/2827; G06F 17/2809; G06F 17/2836; G09B 19/06; H04M 2242/12
USPC ................ 704/1–10, 277, 251, 257, E15.008, 704/E17.073
See application file for complete search history.

(56) References Cited

U.S. PATENT DOCUMENTS

| | | | |
|---|---|---|---|
| 5,724,593 A | 3/1998 | Hargrave, III et al. | |
| 2001/0039003 A1 | 11/2001 | Huang | |
| 2005/0192095 A1* | 9/2005 | Cheng | 463/35 |
| 2009/0094017 A1* | 4/2009 | Chen et al. | 704/3 |
| 2010/0075288 A1 | 3/2010 | Sareday | |
| 2011/0214118 A1* | 9/2011 | Antill et al. | 717/174 |
| 2012/0141959 A1 | 6/2012 | von Ahn Arellano | |
| 2015/0032439 A1* | 1/2015 | Ogawa | 704/2 |

* cited by examiner

*Primary Examiner* — Marivelisse Santiago Cordero
*Assistant Examiner* — Stephen M Brinich
(74) *Attorney, Agent, or Firm* — Nixon Peabody LLP

(57) ABSTRACT

A modular learning system is provided that incorporates translation of language and media metadata associated with learning applications. The author of a learning application may provide a description of a desired translating user to perform translation of the author's learning application. The modular learning system provides a set of translating users meeting the description. The author selects a translating user and the selected translating user is provided on a translation request being made. After translation by the translating user, the language and media are updated to provide the translation to users. A badge is created for display to users to indicate the translation and data about the translation.

15 Claims, 8 Drawing Sheets

| | |
|---|---|
| Certification Metadata 302 | Scoring Metrics Metadata 304 |
| Language Metadata 306 | Performance Type Metadata 308 |
| Duration Metadata 310 | Subject Link/Tag Metadata 312 |
| Age Level Metadata 314 | Learning Facility Metadata 316 |
| Authoring Metadata 318 | Sequence Metadata 320 |
| Tool Metadata 322 | Mode Metadata 324 |
| Media Metadata 326 | Medium Metadata 328 |
| Job Skill Metadata 330 | Error Metadata 332 |
| Template Metadata 334 | Tutor Metadata 336 |

Learning Application 300

*FIG. 3A*

MODULAR TRANSLATION OF LEARNING APPLICATIONS IN A MODULAR LEARNING SYSTEM

CROSS REFERENCE TO RELATED APPLICATIONS

This application is a U.S. National Stage of International Application No. PCT/US2012/054960, filed on Sep. 13, 2012, which claims the benefit of Indian Provisional Specification No. 2597/MUM/2011, titled "Modular translation of Learning Applications in a Modular Learning System" filed on Sep. 13, 2011, both of which are incorporated by reference herein in their entireties.

FIELD OF THE ART

The present disclosure relates generally to modular learning systems, and more particularly to modular translation of learning applications in a modular learning system.

DESCRIPTION OF THE RELATED ART

The current education environment includes members like students or learners, teachers, tutors, coaches, guides, professors or lecturers, content authors, and organizational members like preschools, schools, colleges, universities, educational boards and professional standards authorities, admission testing authorities, placement organizations, recruiters, HR departments of organizations, educational content and media publishers and local, regional, and national governments. All the above maintain some form of transactional and functional relationships with each other. Conventionally, a large number of educational content authors or editors publish books, software and other educational media content and update the same at predetermined intervals of time in coordination with their corresponding educational content publishers. Recently, educational authors manage educational knowledge resources made available, and, optionally, updated or edited collaboratively in the form of wikis, blogs or other static or hypermedia repositories of educational content on the World Wide Web. In some cases, the internal knowledge management of a particular organization may also be managed, edited and updated in the above formats and corresponding interfaces by the human resources or training department of each such organization, for restricted access by particular employees or kinds of employees of the said organization.

Various kinds of publishing software tools and corresponding interfaces like wiki management software, desktop publishing software, and in some cases, even programming software may be used by the creators or editors of such educational content, media and, optionally, hypermedia. In some cases, such physical or digital units of educational content or media are sold or rented by such authors or their corresponding publishers to students, tutoring individuals like teachers, tutors, coaches, guides, professors or lecturers or even educational institutions or training organizations like preschools, schools, colleges, universities, recruiters or HR departments of organizations in addition to digital and physical libraries, through various digital and physical sales channels. In some cases, the publishers of such corresponding authors may manage the translation of educational content of the said author's book or a unit of educational content through in-house resources with one or various translators translating the said book or unit of educational content media in predetermined cycles of time manually or through an exemplary computer implemented method of translation. However, in addition to the long editing cycles of education publishers to publish such books and content in the preferred language of the original author in the first place, such translations usually take many months, even in cases, wherein only a micro component of the said book or unit of educational content has been updated and needs to be correspondingly translated, or the translation updated.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3A is a block diagram of the metadata of a learning application according to one embodiment.

SUMMARY OF THE INVENTION

Figure 1:
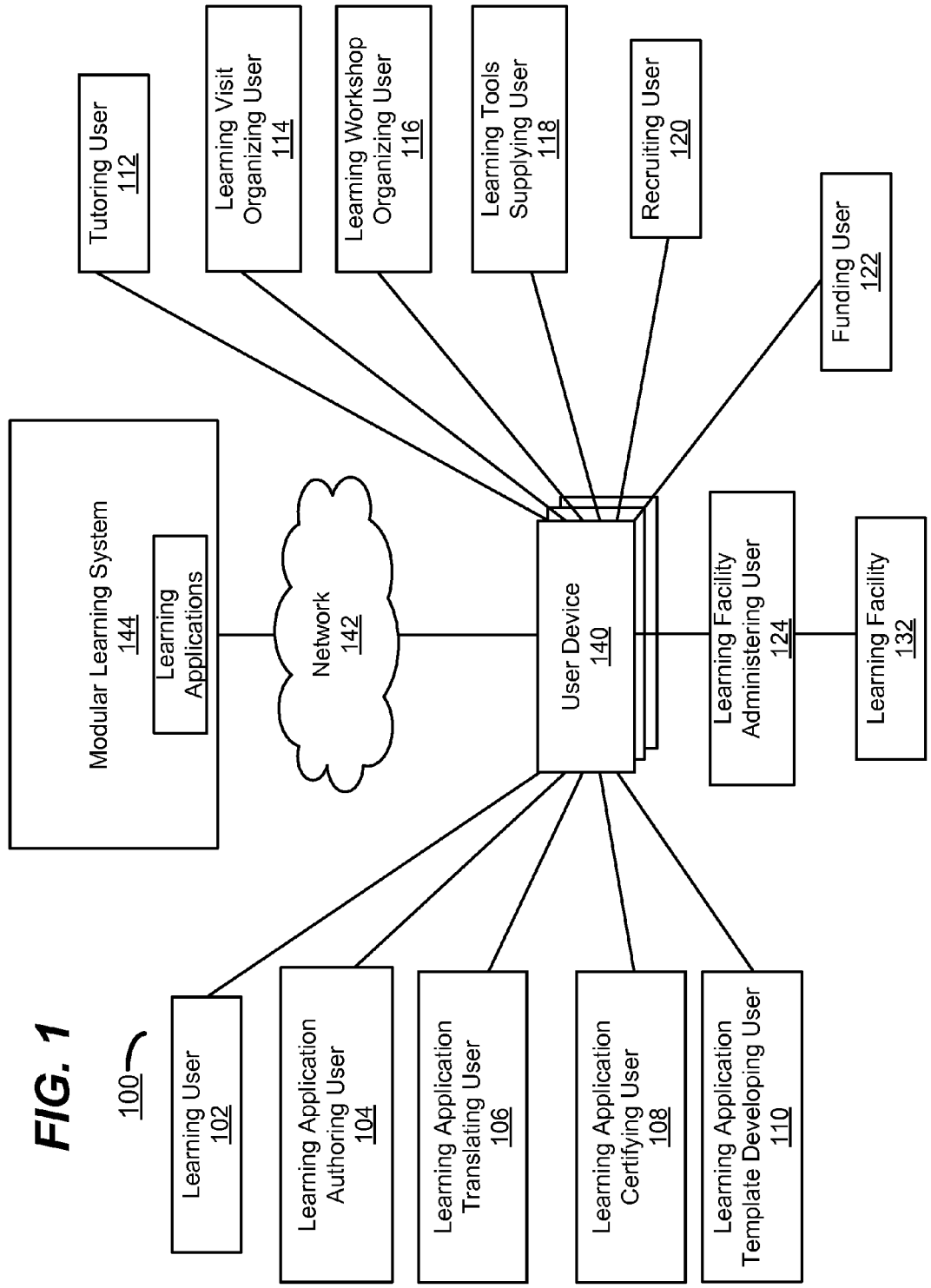
FIG. 1 is a modular learning environment including a modular learning system 144 according to one embodiment.

The present invention specifically relates to translation of learning applications by a set of translating users in a modular learning system. The translation of a learning application involves translation of language and media metadata associated with said learning application.

When the author of any learning application requests translation of the learning application authored by him, based on his preferences, the modular learning system provides a set of translating users compatible with the new language translation request using the database of translating users. On selecting the preferred translating user, request for translation of said application is sent to the selected translating user, and if said request is accepted by him, access to said learning application is granted to the chosen translating user.

The learning application edited and translated by the translating user is stored at a predefined location. After translation by the translating user, the language and media are updated to provide the translation to users. A badge is created for reflecting an indication pertaining to translation of the content.

DETAILED DESCRIPTION

The Figures (FIGS.) and the following description relate to embodiments by way of illustration only. It should be noted that from the following discussion, alternative embodiments of the systems, methods, figures, diagrams and interfaces disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the systems, methods, figures, diagrams and interfaces illustrated herein may be employed without departing from the principles described herein. In the following description, for the purposes of explanation, numerous specific details are set forth in order to provide a thorough understanding of the various embodiments. It will be evident, however to one skilled in the art that the various embodiments may be practiced without these specific details.

Configuration Overview

A system and method for translation of learning applications in a modular learning system environment is provided. A learning application translation management module in the modular learning system 144 may comprise a plurality of modules and generators like a translation items module, a translation timing module, a language database, a language editor module, a unicode character module, a Learning Application Authoring User Database, a transaction processor, a version history module, a translation badge generator, an authentication module and a translation interface generator. A method for translation of learning applications in a modular learning system environment may comprise a plurality of steps like receiving a new language translation request from a learning application authoring user, determining compatible translating users based on a set of language proficiencies associated with each translating user, displaying the compatible translating users on the second user device, receiving a translation request for the selected translating user, displaying the request to the translating user, processing the translation fee transaction, granting learning application access to translating user in a translating interface, storing translated language metadata content edited by the learning application translating user, updating the learning application's translated language metadata and media metadata and displaying an updated language compatibility to learning users.

FIG. 1 is a modular learning environment 100 including a modular learning system 144 according to one embodiment. Modular learning system 144 operates in modular learning environment 100 and communicates with a plurality of user devices 140 over a network 142. The user devices 140 are operated by a plurality of kinds of users in the learning environment. The user devices 140 may comprise any of a variety of computing devices, such as a desktop computer, a laptop, a mobile device, a tablet computer, a set-top box, a kiosk, interactive television, gaming console, and other computing platforms suitable for communicating with modular learning system 144. The modular learning system 144 provides a system for managing curricula, learning facilities, standardized tests, learning applications, tutors, and other modules of a learning experience in micro increments of time and money. The modular learning system 144 enables the various users to communicate with other users in a learning environment and provide services to learning user 102. The network 142 includes a wireless area network, a local area network, a General Packet Radio Service (GPRS) network, an Enhanced Data for Global Evolution (EDGE) network and the like. The user devices 140 are connected to the modular learning system 144 via the network 142.

Modular learning system 144 allows a learning user 102 to manage the purchase and performance of each module of a single microlearning service stack for a learning application (e.g., Breaststroke) or a group of learning applications (e.g., Breaststroke, Freestyle, Butterfly and Swimming Safety). Tutor access, such as access to a swimming instructor may be purchased in various increments, such as in hours. Learning applications such as a breaststroke application with attached instructional media and other data may be purchased in timed access quantities or may be permanently purchased. Learning facility access such as an Olympic Sized Swimming Pool may be purchased in increments of hours or learning application performances such as ten laps. Learning tools or materials such as Swimming Goggles may be purchased as well. Each of these modules may be separately purchased and interacted with through an interface displayed on user device 140. In case of a learning performance which can be completed on the user device 140 itself, the learning application content is not only purchased and managed, but also performed, through an interface displayed on the user device 140. A learning user 102 may manage the purchase and performance of groups of microlearning performances in the form of learning visits and learning workshops, through an interface displayed on user device 140. Learning user 102 may manage an individual learning identity (or learning profile) and offer details of microlearning application performances completed by him, as well as the personal learning metrics, scores, and reviews. This learning identity may be provided to recruiting users for the purpose of placement.

The modular learning system 144 manages, regulates and supervises the purchase, sale, preview, performance and review of a plurality of microlearning applications, each comprised modularly of a tutoring service, a learning application, learning facility access, and/or learning tools or infrastructure access, a learning visit, and/or a workshop as described in further detail below. The modular learning system 144 manages transactional and functional relationships between users of the modular learning system 144. These various users interact with the modular learning system 144 to modify learning applications and provide learning services as described below.

The modular learning system 144 may enable various other users including but not limited to tutors, authors, tool/material suppliers learning application template developers, translators, certifying user, learning facility administrators, learning event organizers, recruiters, and funders to modularly manage at least one of micro tutoring services associated with specific learning applications, microlearning applications, microlearning application templates, translation of microlearning applications, certification of microlearning applications, access to learning facilities, access to learning workshops, organization of learning visits associated with specific learning applications, supply of tools, aids and/or materials, recruitment services, as well as granular funding services.

The modular learning system 144 enables a tutoring user 112 to provide micro tutoring services to learning user 102. Tutoring user 112 are typically individuals with credentials or other knowledge in the area of learning applications. The tutoring user 112 may associate themselves with particular pieces of content to and may indicate qualifications to teach each learning application, as is described further below. The modular learning system 144 manages the sale of micro tutoring services and associated tutoring user 112 with specific learning applications to learning user 102. Tutoring user 112 assist the learning user 102 with learning the subject matter of the learning application. As such, the modular learning system 144 facilitates the meeting and communication of tutors and learners. Tutoring user 112 may also provide learning performance data to the modular learning system 144. The learning performance data may indicate, for example, the level of the learner's mastery or proficiency through scoring or other metrics for reviewing performance at a learning performance task. The tutoring user 112 provides input to the modular learning system 144 using a plurality of learning applications through an interface displayed on the tutoring user's 112 user device 140.

The modular learning system 144 enables a learning application authoring user 104 to manage the drafting, editing, testing, publishing, sale and updates of learning content in applications through an interface displayed on user device 140. That is, the learning application authoring user 104 authors individual pieces of learning content which may be purchased and used by a learning user. For example, a learning application authoring user 104 may create instructional content for learning the backstroke. The instructional content may comprise instructions and multimedia, as well as directions for the learning user 102 to practice aspects of the backstroke in a suitable pool. The learning application authoring user 104 may use a pre-existing application template to create the learning application.

The modular learning system 144 enables a learning application template developing user 110 to create learning templates for use in creating learning applications. The learning application templates provide a framework for creating various types of learning applications. For example, learning application templates may comprise a quiz, simulation, role play, experiment, multimedia material, and other types of learning frameworks. The learning application template developing user 110 may manage the development, testing and sale of the learning application templates to learning application authoring users 104 through an interface displayed on a user device 140.

The modular learning system 144 enables a learning application translating user 106 to manage the translation and translation updates of learning content in applications and sale of such services to microlearning application authors through an interface displayed on a user device 140. The translations are provided to the modular learning system 144 and may be stored with the corresponding learning application to enable providing instructions to learning users 102 in a variety of languages.

The modular learning system 144 enables a learning application certifying user 108 to certify various learning applications according to standards applied by the certifying user 108. Such certifying users may include boards of education at various levels, universities, professional standards groups, and other certification authorities. Certifying users 108 may or may not be formal institutions. For example, a certifying user may include a company establishing a set of learning applications to prepare a candidate for a job with the company. The certifying user 108 manages the certification of each learning application as a part of their respective curricula or syllabi and manages the sale of such certification services to learning application authoring users, through an interface displayed on user device 140.

The learning facility 132 facilitates the performance of specific learning applications available on the modular learning system 144. Learning facilities 132 may comprise any location suitable for performing types of learning applications. For example, learning facilities 132 may comprise an athletic club, a chemistry lab, a science lab, a university, a library, or a tutor's home. In some embodiments, the modular learning system 144 enables a facility administering user 124 to determine the compatibility of various learning applications which can be performed within learning facility 132 by picking the learning infrastructure available in the learning facility and associating the learning facility 132 with each learning application (e.g., Breaststroke) compatible with the learning infrastructure (e.g., Olympic sized Swimming Pool). In one embodiment, rather than expressly associating the learning facility with individual learning applications, the learning facility administering user 124 indicates to the modular learning system 144 the specific infrastructures and amenities available at the learning facility 132. In this embodiment, the modular learning system 144 enables a learning user 102 or learning application authoring user 104 to identify a learning facility 132 which is compatible with the learning application based on the infrastructure available at the learning facility 132. The modular learning system 144 may also identify compatible learning facilities based on metadata associated with the learning application and the infrastructure indicated by the learning facility administering user 124.

The learning facilities 132 may comprise a variety of types of learning facilities, such as an independent learning facility, institutional learning facility, workplace learning facility, and temporary learning facility. The modular learning system 144 enables an administrator 124 of an independent learning facility owned, managed or franchised by the modular learning system 144 to manage the sale of learning facility access for performances of specific microlearning applications as well as sale of learning tools and materials (e.g., sulphuric acid or swimming goggles) or access to the same in micro increments of time and money ($six/hour or $five/learning application performance) depending on multiple factors like the learning infrastructure to be accessed (e.g., Swimming Pool, Computers, Chemistry Lab), number of hours of access, and the like, through an interface displayed on a user device 140.

The modular learning system 144 enables an administrator 124 of an institutional learning facility like a preschool, school, college or university (e.g., Bangalore University) associated, partnered or linked with the modular learning system 144 to, in addition to managing the sale associated with the independent learning facility (e.g., learning facility access for performances of specific microlearning applications), manage the learning performances of a plurality of learners (students or outsiders) across a plurality of learning applications available on the system (with the learning user's explicit consent), optionally delegated to a plurality of teachers, professors, lecturers or coaches registered as tutoring users 112 on the modular learning system 144, through an interface displayed on a user device 140.

The modular learning system 144 enables an administrator 124 of a workspace learning facility associated, partnered or linked with the modular learning system 144 to, in addition to managing the sale associated with the independent learning facility (e.g., learning facility access for performances of specific microlearning applications), manage the learning performances of a plurality of learners (employees) across a plurality of learning applications available on the system (with the learning user's explicit consent), optionally delegated to a plurality of Human Resource Managers, Trainers and/or immediate superiors, registered as tutoring users 112 on the modular learning system, through an interface displayed on a user device 140.

The modular learning system 144 enables an administrator 124 of a temporary learning facility (e.g., a Cricket Ground available for net practice on Saturdays and Sundays from six in the morning to twelve at midnight) to, in addition to managing the sale associated with the independent learning facility (e.g., learning facility access for performances of specific microlearning applications), manage the hours of accessibility to the designated learning facility, through an interface displayed on a user device 140. In addition to managing the sale and performance of microlearning applications, an administrator of an independent, institutional, workspace, or temporary learning facility may manage the modular purchase of learning infrastructure (e.g., chemistry equipment, computers, cricket stumps) as well as learning tools, aids and materials (e.g., sulphuric acid, swimming goggles, cricket bat) from the modular learning system or a third party, topic wise, subject wise, location wise or otherwise based on the learning applications intended to be offered in the designated learning facility, through an interface displayed on a user device 140.

The modular learning system 144 enables a learning visit organizing user 114 to manage the organization of learning visits, and the sale of learning visits to learning users 102. The learning visit organizing user 114 may also associate a learning visit with compatible microlearning applications. Such learning visits may comprise, for example, a visit to a factory or industrial area, a museum, or a trip to a city. The learning visit organizing user 114 may associate the learning visit with learning applications and manage the learning performances if necessary during the learning visits. The management of performances of associated learning applications may be optionally provided by tutoring users 112. The learning visit organizing user 114 communicates with the modular learning system 144 through an interface displayed on a user device 140.

The modular learning system 144 enables a learning workshop organizing user 116 to manage the organization of workshops available to learning users 102. A workshop comprises a plurality of specific microlearning applications to be performed in the workshop, and a sequence of the microlearning applications to be performed at the workshop. The workshop may also specify learning tools, a designated learning facility, and a tutoring user or tutoring users to perform the workshop. As such, the workshop user organizes performance and modules of learning applications to be performed together with a group of learning users 102. The learning workshop organizing users 116 also manage the sale of such microlearning workshop access and manage the learning performances for a plurality of learners. The learning workshop organizing users communicate with the modular learning system 144 through an interface displayed on a user device 140.

The modular learning system 144 enables a learning tools supplying user 118 to provide learning tools and materials such as chemicals, biology samples, computer software, and other materials for use in conjunction with learning applications to learning users 102. The learning tools supplying user 118 manages the organization and sale of the learning tools and materials (or optionally, access to the same) to learning users and administrators of learning facilities 132. The learning tools supplying user 118 may also associate learning tools with particular learning applications stored on modular learning system 144. Alternatively, the learning tools supplying user 118 may designate the tools available and the modular learning system 144 may determine which learning applications may require the tools provided by the learning tools supplying user 118. The learning tools supplying user communicates with the modular learning system 144 through an interface displayed on a user device 140.

The modular learning system 144 enables a recruiter 120 of learning users 102 to manage the recruitment of learning users 102 through the modular learning system 144. The recruiter 120 may view and filter learning users 102 by specific learning applications performed on the system, scores, metrics and reviews generated in relation to the learning applications performed by learning users 102. The recruiter may access and filter learning users 102 based on demographic data like the language used in performing the learning application. Recruiting user 120 may also operate as a certifying user 108 to certify particular learning applications that may be desirable to the recruiting user 120. The recruiting user may use the certified application as a filter prior to considering learning users for a position. The recruiting user 120 manages recruiting access to the modular learning system 144 through an interface displayed on a user device 140.

The modular learning system 144 enables a funding user 122 of learning users 102 to provide funding and scholarship funds and other support to learning users 102. Such funding users 122 may comprise a parent, sibling, friend, spouse, relative, university, employer, or scholarship/grant offering institution. The funds may be provided for the funding of specific learning users or of specific learning applications, or of specific microlearning goods and services associated with the specific learning applications, in small increments, through an interface displayed on a user device 140.

Although the modular learning environment 100 is described as being composed of various, user devices (e.g., personal computer), a network (e.g., internet, intranet, world wide web), learning facilities (e.g., an Independent Learning Facility, an Institutional Learning Facility), it would be appreciated by one skilled in the art that fewer or more kinds of users (e.g., a Learning Application Fact Checking User, a Web Based Offsite Tutoring User), user devices (e.g., a mobile phone device, a portable gaming console device, a tablet device, a learning console device, gaming console device or server device attached to a television or other screen), networks (e.g., an intranet at a preschool, school, college, university, educational board, professional standards authority, coaching/tuition class; a social or professional network; an intranet at a company, HR department, training department and at a training organization) and learning facilities may comprise the modular learning environment 100, with the present disclosure still falling within the scope of various embodiments.

Figure 2:
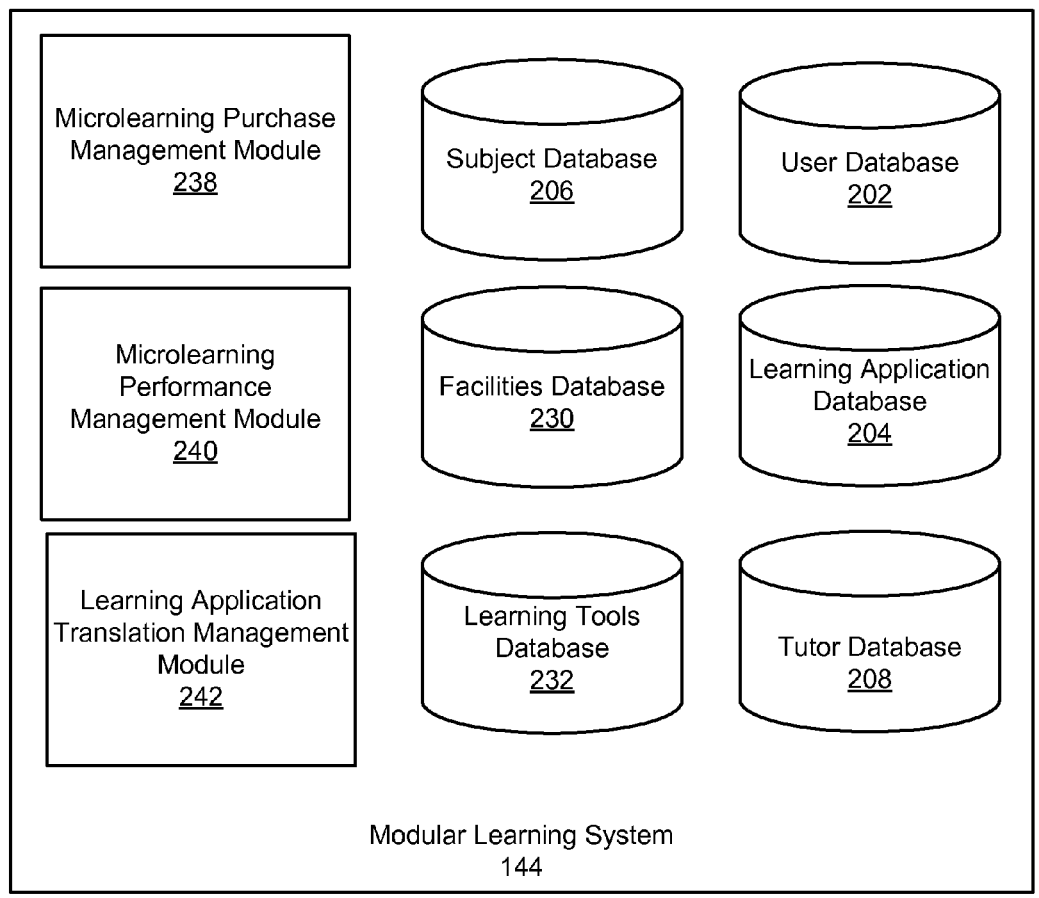
FIG. 2 is a block diagram of a modular learning system according to one embodiment.

FIG. 2 is a block diagram of a modular learning system 144 according to one embodiment. The modular learning system 144 includes a variety of databases and modules for providing learning applications and learning services to users of the modular learning system 144. The modular learning system 144 maintains learning applications in a learning application database 204. The learning applications are sold to users along with microlearning services using the purchase management module 238. Performance of learning applications is enabled by performance management module 240. Additional modules of the modular learning system 144 are described below.

The learning user database 202 is configured for receiving, storing, retrieving and updating a plurality of data fields of each subset of learning users scheduled to attend the microlearning event from the larger plurality of learning users in database 202 of the modular learning system 144.

A user database 202 is further configured for receiving, storing, updating and retrieving a plurality of data fields of each user, such as the user's name, address, and contact details. Depending on the user's role in the modular learning system 144, the user database 202 maintains additional information on the user. For example, for a learning user 102, the user database 202 maintains learning history outside the modular learning system 144, learning application performance history on the modular learning system 144, purchase history of learning applications as well as purchase history of a host of related microlearning purchase items like, for example, timed access to a learning facility 132, timed access to a tutor 112, or his services, and purchase of access to a learning tool from learning tools database 232. In some embodiments, the data fields are used to determine purchase compatibility using purchase management module 238 and to determine performance compatibility using performance management module 240.

The user database 202 may maintain information about each type of user based on the user's role in the system. The user information may be stored in a plurality of databases, each database associated with a user role, or the user roles may be stored in a single user database 202. For example, the additional user roles include learning application authoring users, learning visit organizing users, learning facility administering users, and other types of users of the modular learning system 144.

In one embodiment, a distinct Learning User Database is configured for receiving, storing, updating and retrieving a plurality of data fields of each learning user 102, comprising the learning user's name, address, contact details as well as learning related data fields like learning history outside the modular learning system 144, learning application performance history on the modular learning system 144, purchase history of learning applications as well as purchase history of a host of related microlearning purchase items like, for example, access to learning facility 132, access to tutor 112, and purchase of access to a learning tool. In one embodiment, a distinct Learning Application Authoring User Database is configured for receiving, storing, updating and retrieving a plurality of data fields of each learning application authoring user, say, user 104. In one embodiment, a distinct Independent Learning Facility Administering User Database is configured for receiving, storing, updating and retrieving a plurality of data fields of each independent learning facility administering user, say, user 124. In one embodiment, a distinct Learning Tools Supplying User Database is configured for receiving, storing, updating and retrieving a plurality of data fields of each learning tools supplying user, say, user 118. In one embodiment, a distinct Learning Visit Organizing User Database is configured for receiving, storing, updating and retrieving a plurality of data fields of each learning visit organizing user 114. In one embodiment, a distinct Learning Application Translating User Database is configured for receiving, storing, updating and retrieving a plurality of data fields of each learning application translating user, say, user 106. In one embodiment, a distinct Learning Application Certifying User Database is configured for receiving, storing, updating and retrieving a plurality of data fields of each learning application certifying user, say, user 108. In one embodiment, a distinct Learning Application Template Developing User Database is configured for receiving, storing, updating and retrieving a plurality of data fields of each learning application template developing user, say, user 110. In one embodiment, a distinct Learning Workshop Organizing User Database is configured for receiving, storing, updating and retrieving a plurality of data fields of each learning workshop organizing user, say, user 116. In one embodiment, a distinct Recruiting User Database is configured for receiving, storing, updating and retrieving a plurality of data fields of each recruiting user, say, recruiting user 120. In one embodiment, a distinct Funding User Database is configured for receiving, storing, updating and retrieving a plurality of data fields of each funding user, say, funding user 122.

In one embodiment, a distinct Institutional Learning Facility Administering User Database is configured for receiving, storing, updating and retrieving a plurality of data fields of each, institutional learning facility administering user, say, user 124. In one embodiment, a distinct Workspace Learning Facility Administering User Database is used to is configured for receiving, storing, updating and retrieving a plurality of data fields of each workspace learning facility administering user, say, user 124. In one embodiment, a distinct Temporary Learning Facility Administering User Database is configured for receiving, storing, updating and retrieving a plurality of data fields of each temporary learning facility administering user, say, user 124. In one embodiment, a distinct Learning Facility Database is configured for receiving, storing, updating and retrieving a plurality of data fields of a plurality of kinds of learning facilities, say, facility 132, as received from a plurality of kinds of learning facility administering users, say, user 124. In one embodiment, a distinct Learning Visits Database is configured for receiving, storing, updating and retrieving a plurality of data fields of each learning visit from the respective learning visit organizing user, say user 114. In some embodiments, the data fields of the databases in the above embodiments are used to determine purchase compatibility using purchase management module 238 and to determine performance compatibility using performance management module 240.

The learning application database 204 is configured for receiving, storing, updating and retrieving all the learning application metadata of all learning applications whose performance is managed through the module 238. Optionally, all purchase related metadata of the learning application, like number of copies accessed per day, segmented by location, language, learning facility, user device, as well as other learning related purchase analytics metadata that may be generated during the purchase process may be received, stored, and updated by the microlearning purchase management module in the learning application database 204.

In one embodiment, the database 204 is configured for receiving, storing, updating and retrieving all the learning application metadata of all learning applications whose performance is managed through the module 240. Optionally, all performance related metadata of the learning application, like number of copies performed per day, segmented by location, language, learning facility, user device, as well as other learning related performance analytics metadata that may be generated during the performance process may be received, stored, and updated by the microlearning performance management module in the learning application database 204.

A subject database 206 is configured for receiving, storing, updating and retrieving a plurality of data fields of each subject linked or tagged to each learning application 300 in Subject Metadata 312. The subject database 206 provides a categorization system for the learning applications and enables learning application authoring users, like user 104, to categorize learning applications as belonging to one or more subjects by associating them with one or more subjects, such subjects are then stored in subject metadata 312 of each authored learning application 300. The subject database 206 also allows users to search for learning applications according to particular subjects using the subjects associated with the learning applications. For example, a tutoring user 112 with a mathematics specialty may search the learning applications using the subject database 206 to identify mathematics learning applications for the tutor to associate his services with.

A tutor database 208 is configured for receiving, storing, updating and retrieving a plurality of data fields of each tutoring user, comprising the tutoring user's name, address, contact details, as well as learning related data fields like learning users to whom microlearning services have or are being provided, performance data and performance review data for the tutoring services, tutoring history outside the modular learning system 144, and remittance history. In some embodiments, the data fields are used to determine purchase compatibility using purchase management module 238 and to determine performance compatibility using performance management module 240.

A learning facilities database 230 is configured for receiving, storing, updating and retrieving a plurality of data fields of a plurality of kinds of learning facilities such as learning facility 132 as received from learning facility administering users 124. In some embodiments, the data fields are used to determine purchase compatibility using purchase management module 238 and to determine performance compatibility using performance management module 240.

A learning tools database 232 is configured for receiving, storing, updating and retrieving a plurality of data fields of each learning tool or material from each learning tools supplying user 118. In some embodiments, the data fields are used to determine purchase compatibility using purchase management module 238 and to determine performance compatibility using performance management module 240.

Each of these databases, such as the tutor database 208, facilities database 230, and learning tools database 232, may also include information relating to purchase and performance compatibility. For example, a tutor in the tutor database may specify the tutor is only willing to teach students aged thirty to forty, or a learning facility may indicate it is only willing to allow entry to learning users who are a member of the facility.

A purchase management module 238 is configured for managing the purchase of learning applications and associated application services as a microlearning stack by the learning user 102.

A performance management module 240 is configured for managing the performance of learning applications and associated application services as a microlearning stack by the learning user 102.

A translation management module 242 is configured for managing the translation of learning applications and associated application services as a microlearning stack by the learning user 102. The translation management module 242 enables translating users to review and translate learning applications and assists learning application authors to identify translators for the learning applications.

In one embodiment, the tutor database, learning facilities database, tools database and other application services databases form a single consolidated application services database in modular learning system 144.

Although the modular learning system 144 is described as being composed of various modules like databases and modules, the modular learning system 144 may comprise fewer or more databases, modules, and other modules. For example, the modular learning system 144 may include a Learning Application Genre Database, a Locational Learning Facility Price Range Database, a Learning Workshop Database, a Multilingual Dictionary Database, a Concept Tags Database, a Learning Objectives/Outcomes Database, and a Micro tutoring Services Database, and a Skill and Ability Tags Database. The modular learning system 144 may also include an Age Compatibility Module, a Learner Ranking Module, a Tutor Ranking Module, a Learner Billing Module, a Tutor Remittance Module, a Profile Management Module, a User Roles Management Module, a Learning Tools Management Module, a Learning Facility Management Module, Metadata Management Module, a Notification Module, a Recruitment Module, a Funding Module, a Map Module, a Learning Application Template Programming Interface Module, an Age Compatibility Module or a Translation Interface Module, with the present disclosure still falling within the scope of various embodiments. In some embodiments, an individual or group may play a plurality of user roles on the modular learning system, (e.g., tutoring user learning new applications as a learning user through another tutoring user, a learning application authoring user translating the authored application or developing the application template), with the present disclosure still falling within the scope of various embodiments.

In various embodiments the modular learning system 144 may be any of a web application, a mobile application, or an embedded module or subsystem of a social networking environment, a learning content management system, a learning management system, a professional networking environment, an electronic commerce system, an electronic payments system, a mobile operating system, a computer based operating system, a computer-implemented method or of a tablet based operating system, with the present disclosure still falling within the scope of various embodiments.

In one embodiment, a distinct roles management module is configured for managing and authorizing different roles associated with the various users of the modular learning system 144 and in the respective user databases. For example, the roles management module may provide distinct feature tabs and functionalities to each user based on the role associated with him or her. It can be noted that, the roles management module may enable a user to have one or more roles for accessing the modular learning system 144. For example, a tutoring user can avail the functionality and interface tabs of a learning user and also of a translating user if authorized by the modular learning system 144.

In one embodiment, a distinct metadata management module is configured for managing metadata associated with a plurality of specific learning applications, like learning application 300. In one embodiment, the metadata management module is configured for receiving, storing, updating and retrieving various types of metadata associated with each learning application 300 in the learning application database 204. In another embodiment, the metadata management module is configured for receiving and storing updated metadata of a specific learning application 300 in database 204 at regular intervals of time as updated by different users in authorized user roles and retrieving the required metadata when requested by the purchase management module 238 and the performance management module 240 for determining compatibility and performance compatibility of requested microlearning service stack respectively. In yet another embodiment, the metadata management module enables various users of the modular learning platform to update metadata associated with specific learning applications in the learning application database according to their user role.

It is appreciated that, in some embodiments, various databases like 202, 204, 206, 208, 230, and 232, modules 238, 240 and 242 as well as the databases, modules, modules and engines of the above embodiments may be stored in the form of machine readable instructions in the memory of the modular learning system 144 and executed by a processor of the modular learning system 144 to perform one or more embodiments disclosed herein. Alternatively, the various databases like 202, 204, 206, 208, 230, and 232, modules 238, 240 and 242 as well as the databases, modules, components and engines of the above embodiments may be implemented in the modular learning system in the form of an configured to perform one or more embodiments disclosed herein.

FIG. 3A is a block diagram of a learning application 300, according to one embodiment. Each learning application 300 comprises a plurality of kinds of application metadata in addition to the instructional content and associated media for a particular topic or subject. The instructional content and media of each learning application 300 may comprise a specific unit of instruction for a particular portion of knowledge or a skill, and may vary widely in scope. The learning application 300 may be very narrow in scope, such as "treading water" or may be broad in scope, such as "overview of world history", depending on the authoring process of learning application authoring user 104. The learning application 300 could indicate a theoria (to think, a theory based application using primarily memory, reasoning, logic) performance type or a praxis performance type (to do, a practical performance type or a poeisis performance type). The learning application 300 may comprise metadata indicating associated application services for purchasing or performing the learning application 300 like tutor metadata 336, tools metadata 322 and learning facility metadata 316. In one embodiment, the learning application 300 may be requested for purchase or performance with associated application services as a microlearning service stack, wherein the application services comprise of access to tutoring user 112, access to a learning tool from learning tools database 232 and access to a learning facility from facilities database 230. For example, the media metadata 326 of a learning application 300 provided by learning application authoring user 104 may specify instructions for learning how to swim a breaststroke, but the media metadata 326 does not typically specify individual pools i.e. learning facilities to perform the learning application or tutors to coach and review the performance. Rather, the application services metadata like tutor metadata 336, tools metadata 322 and learning facility metadata 316 indicates tutors, tools, and facilities which the learning user may choose to perform the learning application's instructions.

The Certification Metadata 302 is configured for receiving, storing, retrieving, displaying and updating certification history as well as live certifications of the learning application 300, including, for example, a certification from educational board 108 and another educational board in another state, present as a certifying user in database 202 or a distinct certifying user database. In some embodiments, the certification metadata is also used to determine purchase compatibility in the microlearning purchase management module 238 through learning application database 204 and to determine performance compatibility in the microlearning performance management module 240 through learning application database 204.

The Scoring Metrics Metadata 304 is configured for receiving, storing, retrieving, displaying and updating a plurality of metrics for quantitative and qualitative scoring as defined and updated for learning application 300 by learning application authoring user 104. In some embodiments, the quantitative scoring of each metric is conducted during the performance by a dedicated module within the learning application 300 itself, while in other embodiments of a performance, especially a non-screen based praxis or poeisis performance, the quantitative and optionally, qualitative score for each metric is received through a user device 140 from the learning user 102 and/or the tutoring user 112. In some embodiments, the scoring metrics metadata is also used to determine purchase compatibility in the microlearning purchase management module 238 through learning application database 204 and to determine performance compatibility in the microlearning performance management module 240 through learning application database 204.

The Language Metadata 306 is configured for receiving, storing, retrieving, displaying and updating a plurality of translations of all user viewable application metadata for learning application 300 translated by, for example, learning application translating user 106 into Bengali, comprising of media metadata 326 like instructional text, subtitles to audio and video instructions, and all other linguistic content for the preview, performance and review of learning application 300 by learning user 102 and preview and review of the learning performance by tutoring user 112. In some embodiments, metadata 306 further comprises translations in at least one other language, of performance type metadata 308, duration metadata 310, subject links and tags metadata 312, age level metadata 314, learning facility metadata 316, authoring metadata 318, sequence metadata 320, tool metadata 322, mode metadata 324, medium metadata 328 and job skill metadata 330. In some embodiments, the language metadata is also used to determine purchase compatibility in the microlearning purchase management module 238 through learning application database 204 and to determine performance compatibility in the microlearning performance management module 240 through learning application database 204.

The Performance Type Metadata 308 is configured for receiving, storing, retrieving, displaying and updating the performance type of the learning application 300. For example, the metadata 308 could indicate a theoria (to think, a theory based application using primarily memory, reasoning, logic, like a 'Biomechanics of Swimming' Pop Quiz) performance type or a praxis performance type (to do, a practical performance type like an 'eight hundred meters Freestyle Swim as per Olympic performance guidelines' or a poeisis performance type (to make, a creation oriented performance type like a 'five minute Synchronized Swimming Choreography'), such that the learning user is already aware of the task or performance type before purchasing and performing the learning application 300. In some embodiments, the performance type metadata is also used to determine purchase compatibility in the microlearning purchase management module 238 through learning application database 204 and to determine performance compatibility in the microlearning performance management module 240 through learning application database 204.

The Duration Metadata 310 is configured for receiving, storing, retrieving, displaying and updating the suggested duration of the learning application 300. In some embodiments, the metadata 310 indicates a fixed duration like, fifteen minutes, or thirty minutes, or one hour, while in other embodiments, the metadata indicates a variable duration with, optionally, a predetermined minimum or maximum duration depending on the duration metadata set by the learning application authoring user 104. In some embodiments, the duration metadata is also used to determine purchase compatibility in the microlearning purchase management module 238 through learning application database 204 and to determine performance compatibility in the microlearning performance management module 240 through learning application database 204.

The Subject Metadata 312 is configured for receiving, storing, retrieving, displaying and updating a plurality of subject links and tags attached to the learning application 300 by the learning application authoring user from among the subject links and tags present in the Subject Database 206. In some embodiments, the subject links and tags are attached to specific concepts or terms within the Media Metadata 326. In some embodiments, the subject link/tag metadata is also used to determine purchase compatibility in the microlearning purchase management module 238 through learning application database 204 and to determine performance compatibility in the microlearning performance management module 240 through learning application database 204.

The Age Level Metadata 314 is configured for receiving, storing, retrieving, displaying and updating the suggested age level of the learning user 102 for performance of the learning application 300. In some embodiments, the age level is set as a minimum suggested age say, for example, ten+ by the learning application authoring user 104. In other embodiments, a range of suggested learner ages is set by the learning application authoring user 104. In some embodiments, the age level metadata is also used to determine purchase compatibility in the microlearning purchase management module 238 through learning application database 204 and to determine performance compatibility in the microlearning performance management module 240 through learning application database 204.

The Learning Facility Metadata 316 is configured for receiving, storing, retrieving, displaying and updating the suggested learning infrastructure required in a learning facility for performance of the learning application 300. In some embodiments, such learning facilities and infrastructure (e.g., Olympic Sized Swimming Pool) required for the performance of the learning application (e.g., $800m$ Freestyle to Olympic Guidelines) is received and updated by the learning application authoring user 104 by picking the same from a learning facilities database 230 available on the modular learning system 144. In other embodiments the metadata 316 is received and updated by the administering user 124 of learning facility 132. In some embodiments, the learning facility metadata is also used to determine purchase compatibility in the microlearning purchase management module 238 through learning application database 204 and to determine performance compatibility in the microlearning performance management module 240 through learning application database 204.

The Authoring Metadata 318 is configured for receiving, storing, retrieving, displaying and updating the authoring metadata received by the learning application author 104, including for example the name, signature, contact details, intellectual property disclaimer and other information of the user or user group. In some embodiments, the metadata also includes metadata generated by the modular learning system 144 during the authoring user's editing process, including the version history, tracked changes and time stamps of edits and updates to the learning application. In some embodiments, the metadata may also include citations to other learning application s or other learning application authoring users made by the user 104.

The Sequence Metadata 320 is configured for receiving, storing, retrieving, displaying and updating the suggested sequence of performance of the learning application 300 relative to another learning application. The sequence metadata may indicate if the learning application should be performed before, after, instead of, or with another learning application by learning application authoring user 104. The user 104 may wish for any learning user, say 102 to perform an advanced microbiology learning application 300 only after performing a corresponding beginner's microbiology learning application, irrespective of the learning user's age or quality of performance. In other embodiments, wherein the learning application authoring user is not the author of the suggested beginner's application, the user 104 may input a sequence suggesting to the learning user 102 to perform the learning application before or after a learning application authored by another learning application authoring user. In some embodiments, the sequence metadata is also used to determine purchase compatibility in the microlearning purchase management module 238 through learning application database 204 and to determine performance compatibility in the microlearning performance management module 240 through learning application database 204.

The Tool Metadata 322 is configured for receiving, storing, retrieving, displaying and updating the compatible tools or learning materials to the learning application 300. In some embodiments, the tool compatibility is received from and updated by the learning application authoring user 104 by accessing the tools database 232. In other embodiments, the tool compatibility is received and updated by the learning tools supplying user 118 by accessing the learning application database 204. In still other embodiments, the tool compatibility may be updated by the modular learning system 144. In some embodiments, the tool metadata is used to determine purchase compatibility of the microlearning purchase management module 238 through learning application database 204 and to determine performance compatibility in the microlearning performance management module 240 through learning application database 204. In some embodiments, wherein the learning tool is a peripheral input device which can be connected to the user device 140 during the learning application performance (e.g., Electric Guitar attached to a user device 140 during an 'Introduction to Hard Rock' learning application) the Tool Metadata includes the compatibility to the user device 140. In other embodiments, wherein the learning material is not material to the user device 140, (e.g., Sulphuric Acid during a Chemistry Experiment) the Tool Metadata may not include any additional user device compatibility.

The Mode Metadata 324 is configured for receiving, storing, retrieving, displaying and updating the available modes of performance of the learning application. In some embodiments, the mode metadata 324 is determined by the modes chosen by the learning application authoring user from the learning application template chosen. In various embodiments, the learning application may comprise an individual learner performance mode, a learner plus learner cooperative performance mode, a learner versus learner competitive performance mode, a learner plus tutor cooperative performance mode, a learner versus tutor competitive performance mode, a limited plurality of learners (e.g., 4 learners) cooperative performance mode, a limited plurality of learners (e.g., 4 learners) competitive performance mode, a tutor plus limited plurality of learners (e.g., 9 learners) cooperative performance mode (a typical classroom mode). Although the Mode Metadata 324 is described as being composed of various available modes as chosen by the learning application authoring user, various other modes (e.g., a limited plurality of learners vs. a limited plurality of learners competitive performance mode) may comprise the Mode Metadata 324 and still fall within the scope of various embodiments. In some embodiments, the various Media Metadata 326 for the preview, performance and review screens for each mode of the same learning application and the sequence of the same (especially wherein the learning application 300 is performed by multiple users from the same user device and, optionally, by viewing the same display device) is received, stored, retrieved, displayed and updated in the Media Metadata 326. In some embodiments, the mode metadata 324 is also used to determine purchase compatibility in the microlearning purchase management module 238 through learning application database 204 and to determine performance compatibility in the microlearning performance management module 240 through learning application database 204.

The Media Metadata 326 is configured for receiving, storing, retrieving, displaying and updating text, image, audio, video, animation, links and other interactive elements of the learning application as received and updated by the learning application authoring user 104 during the publishing and revision of the learning application 300. In other embodiments, the learning application Media Metadata may comprise the theoria, praxis or poeisis task or, optionally, plurality of tasks to be completed during the performance, their sequence, and, optionally, the learning outcomes and objectives of the same. In some embodiments, the media metadata is also used to determine purchase compatibility in the microlearning purchase management module 238 through learning application database 204 and to determine performance compatibility in the microlearning performance management module 240 through learning application database 204.

The Medium Metadata 328 is configured for receiving, storing, retrieving, displaying and updating the medium of access to the learning application preview, review and performance screen during the microlearning performance. For example, for a Beginner's Kathak Dancing microlearning Application, in addition to requiring a compatible learning facility and tutoring user, the learning application authoring user 104 or, optionally, modular learning system 144 may require the preview and review screen to be viewable only on a display device connected to a learning console user device or the display device of a computer device but not a mobile device screen to ensure an optimum learning experience. In another case, for a Kathak Quiz microlearning application, the learning application authoring user 104 or, optionally, modular learning system 144 may require the performance screen, preview screen and review screen to be viewable only on a mobile device screen but not on a display device connected to a learning console user device, or the display device of a computer device. In some embodiments, the medium metadata may further comprise the compatibility to a plurality of software platforms and, optionally, runtime environments as determined by the modular learning system 144. In some embodiments, the medium metadata is also used to determine purchase compatibility in the microlearning purchase management module 238 through learning application database 204 and to determine performance compatibility in the microlearning performance management module 240 through learning application database 204.

The Job Skill Metadata 330 is configured for receiving, storing, retrieving, displaying and updating the skills and abilities tagged to the learning application 300 by the learning application authoring user 104, the recruiting user 120 or, optionally, the modular learning system 144 from a skills and abilities database provided by the modular learning system 144. In some embodiments, the metadata is used by a recruiting user 120 to post the completion of the learning application (optionally, in a controlled testing environment) or group of applications as a minimum requirement for a particular job role to a plurality of potentially employable learning users. In other embodiments, the metadata is used by the recruiting user 120 to post the requirement of completion of the learning application 300 (optionally, in a controlled testing environment) or group of applications as a minimum requirement for a promotion to a higher post in a particular organization, to a plurality of potentially employable learning users. In some embodiments, the job skill metadata is also used to determine purchase compatibility in the microlearning purchase management module 238 through learning application database 204 and to determine performance compatibility in the microlearning performance management module 240 through learning application database 204.

The Error Metadata 332 is configured for receiving, storing, retrieving, displaying and updating the potential errors which can be made by the learning user 102 (e.g., 10 potential errors in an auditing microlearning application), as determined by the learning application authoring user 104. In some embodiments, wherein the learning application (e.g., a Karnataka History Quiz) is performed through an input device on a user device 140 itself, the error metadata may be synchronized to each potential input point during the learning application 300 performed through the user device 140 by the learning application authoring user 104. In some embodiments, wherein the learning application (e.g., a Karate kata) 300's error metadata is outside the recordable boundaries of the user device 140, the potential errors may be entered with reference to each instructional step of the performance by the learning application authoring user 104, such that at the time of the performance, the tutoring user (or, in some modes, the learning user 102 himself, another learning user, or the recruiting user 120) may note errors in each observable step of the performance and confirm the same on user device 140 to generate the score. In other embodiments, wherein the error observed by the observing user (say, tutoring user 112) is not part of the potential errors in the Error Metadata 332 of the application 300, the tutoring user 112 may update such errors to the Errors Metadata, or optionally, send the same to the learning application authoring user 104, to be updated after review. In some embodiments, the error metadata is also used to determine purchase compatibility in the microlearning purchase management module 238 through learning application database 204 and to determine performance compatibility in the microlearning performance management module 240 through learning application database 204.

The Template Metadata 334 is configured for receiving, storing, retrieving, displaying and updating the default script, formatting and media modules of the learning application template used to author the learning application 300. In some embodiments, wherein a particular sequence and format of the same has been chosen by the learning application authoring user from the options offered in the template developed by the learning application template developing user, the chosen setting may be a part of the Template Metadata 334. In various embodiments, the learning application templates may comprise a quiz, role play, simulation, project, experiment, essay, recital, research paper, race, challenge, problem, game, question, exercise or problem set. In some embodiments, the templates may be for performances conducted and supervised in front of a display device with an input device connected to the user device 140, while in other embodiments the templates may be for previews, reviews and guidelines for performances conducted without the input device, with the user device 140 merely placed next to the performance area or learning station (e.g., for Praxis Tasks in Dance Applications) as a reference point. Although the Template Metadata is described as being composed of various available templates as developed by the learning application template authoring user and chosen by the learning application authoring user, various other templates (e.g., a Swimming Race Template, a Patent Drafting Template) may comprise the Template Metadata 334 and still fall within the scope of various embodiments. In some embodiments, the template metadata is also used to determine purchase compatibility in the microlearning purchase management module 238 through learning application database 204 and to determine performance compatibility in the microlearning performance management module 240 through learning application database 204.

The Tutor Metadata 336 is configured for receiving, storing, retrieving, displaying and updating the compatibility of tutoring users to learning application. In some embodiments, the tutoring user compatibility is received from and updated by the tutoring user 112 by updating the tutor database 208 (e.g., a Mathematics Tutoring User whose medium of instruction is Mandarin, updating compatibility to a plurality of Mathematics microlearning applications available in Mandarin, in the tutor database 208). In other embodiments, the tutoring user compatibility metadata is received from and updated by the tutoring user 112 by accessing the learning application database 204. In still other embodiments, the tutoring user compatibility metadata may be updated by the modular learning system 144. In some embodiments, the Tutor Metadata 336 is also used to determine purchase compatibility in the microlearning purchase management module 238 through learning application database 204 and to determine performance compatibility in the microlearning performance management module 240 through learning application database 204.

In various embodiments, the metadata of a learning application 300 is configured for retrieving, displaying to and updating by a plurality of kinds of users as may be applicable to the kind of metadata and the kind of user. Optionally, in addition to receiving and storing the metadata, the modular learning system 144 may update the learning application metadata as and when generated in the system through a dynamic metadata update module or through a dedicated administering user. In some embodiments, the learning application authoring user 104 may further play the role of the learning application template developing user. In some embodiments, the modular learning system 144 may play the role of the learning application authoring user 104 and, optionally, the role of the learning application template developing user 110 to author and update the media and template metadata of the learning application 300.

In some embodiments, the microlearning purchase management module 238 and microlearning performance management module 240 retrieve some or all of the above metadata associated with the learning application 300 from a learning application database 204 in a repository module of the modular learning system 144.

In some embodiments, the media metadata 326 of the learning application may comprise an electronic textbook, an electronic journal, an instructional video, or an instructional animation. In some embodiments each learning application 300, may be a distinct mobile application, browser based web application, or a desktop application. In some embodiments, each learning application 300 may be an executable file, a program, add in, macro, plug-in, or other program of instructions associated with a plurality of application programming interfaces of the modular learning system 144.

Although the learning application 300 is described as comprising various metadata and associated data fields stored and updated in learning application database 204, fewer or more metadata and associated data fields (e.g., Application Programming Interface Metadata, Organization versus Organization Social Learning Mode Metadata, University versus University Social Learning Mode Metadata, Testing Metadata, Learning Visits Metadata, Learning Workshops Metadata, Tutorials Metadata) may comprise the Learning Application 300 and associated learning application database 204, with the present disclosure still falling within the scope of various embodiments. In some embodiments, each version of the same learning application 300 with different metadata, for example language metadata, is treated as a distinct learning application in learning application database 204.

In some embodiments, an authorization to update certification metadata 302 of a learning application 300 is limited to a predetermined plurality of certifying users like user 108 and recruiting users like user 120. In some embodiments, an authorization to update scoring metrics metadata 304, performance type metadata 308, age level metadata 314, authoring metadata 318, mode metadata 324, media metadata 326, medium metadata 328, and error metadata 332 of a learning application 300 is limited to a predetermined plurality of learning application authoring users like user 104. In some embodiments, an authorization to update language metadata 306 of a learning application 300 is limited to a predetermined plurality of learning application translating users 106. In some embodiments, an authorization to update duration metadata 310 of a learning application 300 is limited to a predetermined plurality of learning application authoring users like user 104 and learning application template developing users like user 110. In some embodiments, an authorization to update subject link/tag metadata 312 of a learning application 300 is limited to a predetermined plurality of users in any user role. In various embodiments, such authorizations may be set by an administrator of system 144 based on the user role, user profile information and user preferences information of the corresponding users.

In some embodiments, an authorization to update learning facility metadata 316 of a learning application 300 with associated learning facilities is limited to a predetermined plurality of learning facility administering users like user 124. In some embodiments, an authorization to update sequence metadata 320 of a learning application 300 is limited to a predetermined plurality of learning application authoring users like user 104 and tutoring users like user 112. In some embodiments, an authorization to update tool metadata 322 of a learning application 300 with associated learning tools is limited to a predetermined plurality of tool supplying users like user 118. In some embodiments, an authorization to update job skill metadata 330 of a learning application 300 is limited to a predetermined plurality of recruiting users like user 120. In some embodiments, an authorization to update template metadata 334 of a learning application 300 is limited to a predetermined plurality of learning application authoring users like user 104 and a predetermined plurality of template developing users like user 110. In some embodiments, an authorization to update tutor metadata 336 of a learning application 300 with associated tutoring services is limited to a predetermined plurality of tutoring users like user 112. In some embodiments, an authorization to update an optional learning event metadata of a learning application 300 with associated learning workshops, visits and other learning events is limited to a predetermined plurality of learning workshop organizing users like user 116 and learning visit organizing users like user 114. In some embodiments, the associations of application services to learning applications are enabled automatically by a metadata association module in the system 144. In some embodiments, each learning application 300 is associated with a subset of learning facilities in a learning facilities database 230. In some embodiments, each learning application 300 is further associated with a subset of learning stations of each associated learning facility. In some embodiments, each learning application is associated with a subset of tutors in a tutor database 208. In some embodiments, each learning application is associated with a subset of tools in a learning tools database 232.

Figure 3B:
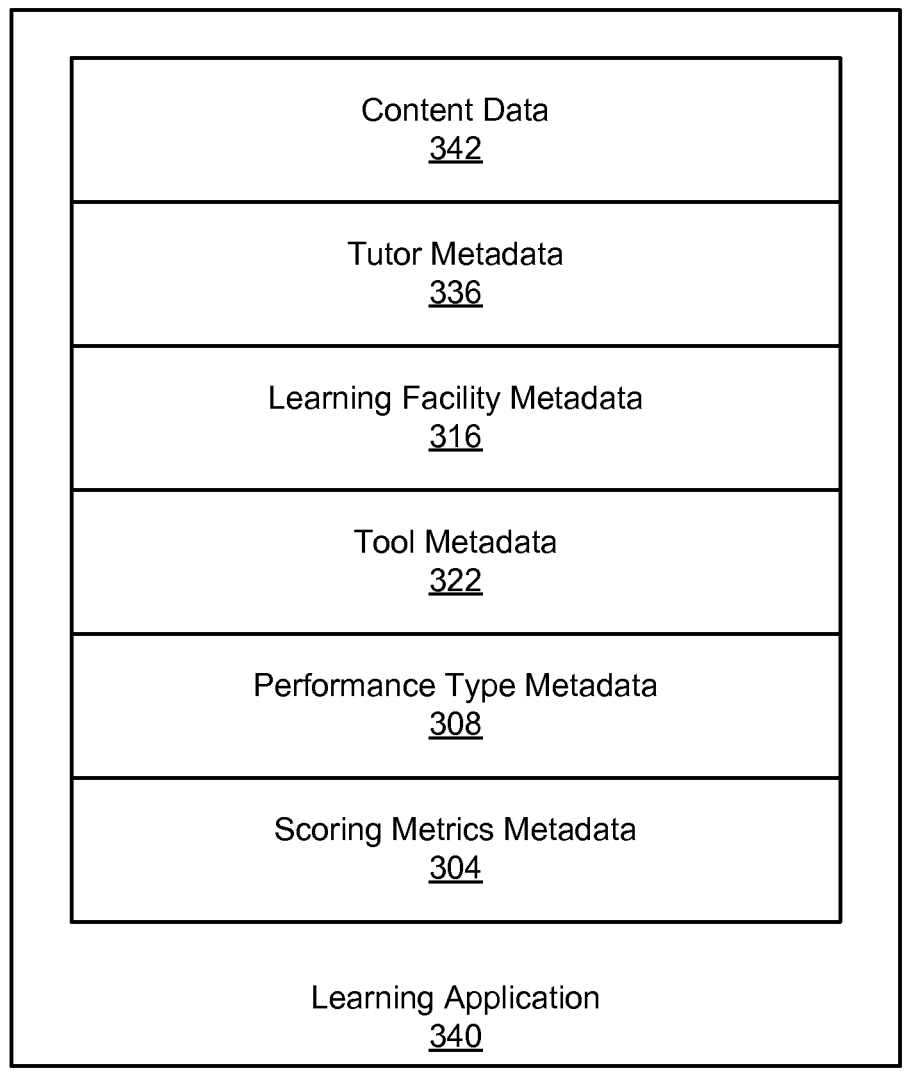
FIG. 3B is a block diagram of the metadata of a learning application according to an alternative embodiment.

FIG. 3B is a block diagram of a learning application 340 according to another example embodiment. The learning application 340 is illustrated to depict metadata of the learning application related to a microlearning service stack. The learning application 340 also illustrates some other performance data used during its performance by a learner. This microlearning service stack may be requested for purchase or performance by learning user 102. In this embodiment, the microlearning service stack includes a learning application 340, a time based tutoring service by a particular tutor in database 208, time based access to a particular learning facility from database 230, and access to a particular tool from database 232. The particular services above may or may not be associated with the corresponding tutor metadata, facilities metadata, and tool metadata of learning application 340 at the time of a request. The learning application 340 includes content data 342 which designates particular content media and content attributes of the learning application 340. The learning application also includes other metadata as described above, such as tutor metadata 336, learning facility metadata 316, learning tool metadata 322, performance type metadata 308, and scoring metrics metadata 304. As such, the learning application 340 illustrates some aspects of the learning application used for purchase or performance of the learning application 340 by a learner as part of a microlearning service stack, such as content, tutors, facilities, and tools. The learning application 340 may also include any other metadata as described above with reference to FIG. 3A. Any other metadata as described above with reference to FIG. 3A may also be part of the content data 342 of the learning application 340.

The lifecycle of a learning application 300 is now described according to one embodiment. Initially, a learning application template developing user 110 creates a learning application template stored in a distinct template database in a modular learning system 144. Next, the learning application authoring user 104 publishes learning application content stored as media metadata of the learning application 300. In case a template has been chosen for the application 300, the template metadata 334 is stored as well. The tutor metadata 336, learning facility metadata 316, learning tool metadata 322 and other optional application services metadata indicating tutoring services, learning facilities, learning tools, and other application service types associated with the learning application 300 are dynamically updated by the corresponding tutoring users, learning facility administrators, tool suppliers and other application service providers. At this point, the learning user may modularly select application services in a microlearning stack to purchase or perform the learning application. Next, the learning user 102 selects the learning application 300 and identifies application services requested for purchase or performance as a consolidated stack. The approval of the purchase or performance request for learning application 300 and particular application services in the microlearning service stack may be determined by the specific metadata of the learning application 300 being associated with corresponding application services, and other specific metadata of the learning application being compatible with the profile information and preferences of the learning user.

Figure 4:
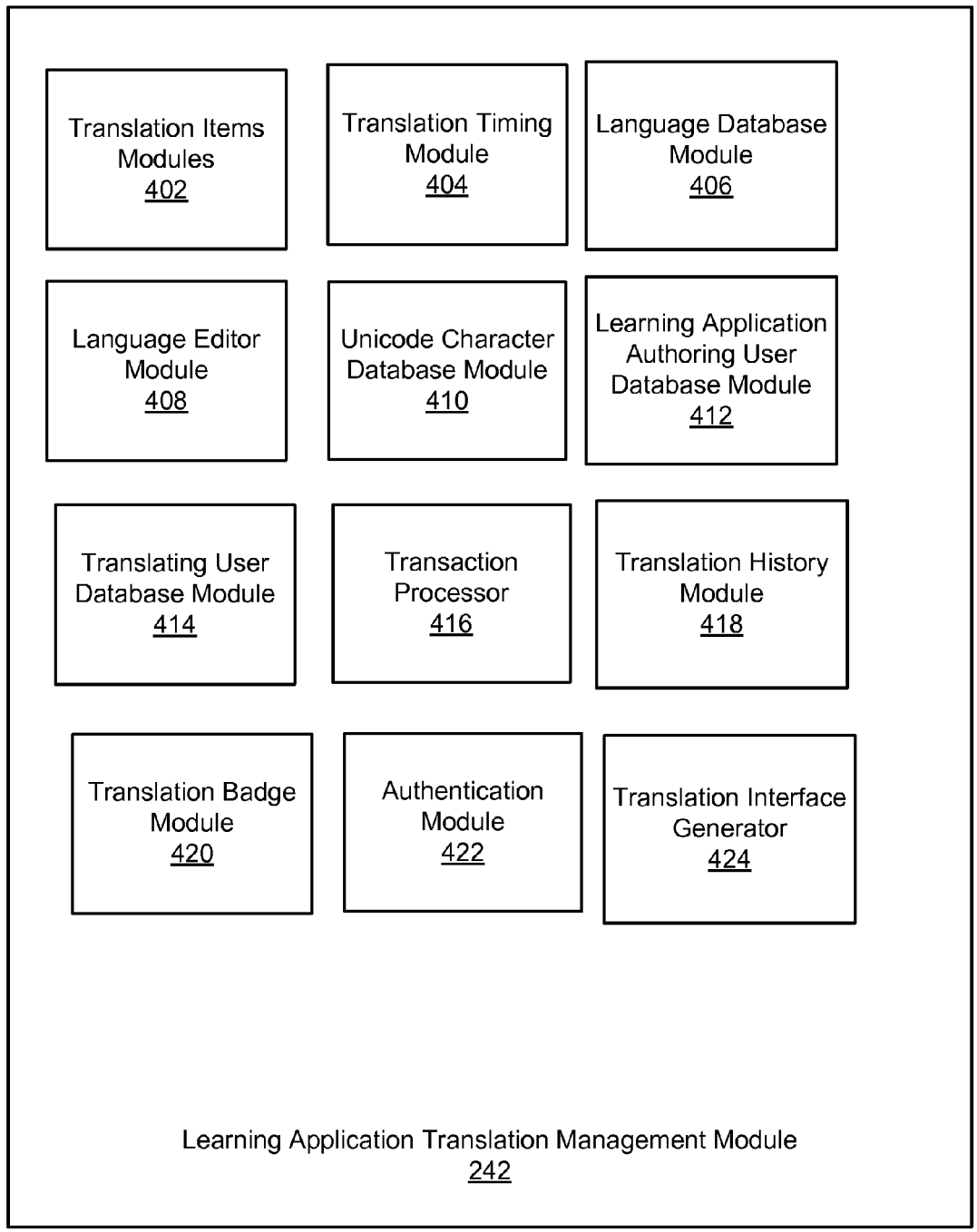
FIG. 4 is a block diagram of a learning application translation management module according to one embodiment.

FIG. 4 is a block diagram 400 of a learning application translation management module 242 according to one embodiment. Upon receiving a translation request from an authoring user the learning application translation management module 242 requests the translation items module 402 to generate a unique translation item for the translation request based on the requested language of translation as well as optionally, a plurality of other request related data items received from the learning application authoring user 104. In some embodiments, upon confirmation of completion of the translation request, the module 402 updates the plurality of translated metadata in language metadata 306 of the learning application 300 in the corresponding metadata field of learning application 300 in the learning application metadata module of the modular learning system 144 by accessing the same from the updated language metadata content stored in translation history module 418 for the translation item of the translation request. In some embodiments, wherein the learning application authoring user 104 while publishing or updating the learning application with the translated content received from translating user 106 wishes to review the translated content in the language metadata of the learning application 300, an additional step of accessing the translation item from translation items module 402 and translation history module 418 may occur, with the learning application translation management module not authorized to update the learning application language metadata and, optionally, other metadata in the learning application metadata module of system 144 until such a confirmation is received from user 104 through a learning application publishing management module in system 144.

The translation timing module 404 is configured for recording the date and time at which a learning application is translated by one or a plurality of translating users in database 414 for each learning application 300. In some embodiments, wherein the learning application authoring user 104 updates the edition of the learning application 300 with corresponding updated content in media metadata 326 in user 104's preferred language, and the learning application authoring user 104 requests the translating user 106 to update the language metadata 306 with a translation of updated content in an already translated application 300, the translation timing module 404 records the date and time at which the learning application 300 was last translated by translating user 106.

The language database 406 is configured for receiving, storing, retrieving and updating a plurality of language preference items to be chosen as preferred languages for translation by learning application authoring user 104 as part of the language translation request made to a translating user 106 on the modular learning system 144. In some embodiments, each language preference item in database 406 and chosen by each authoring user 104 is compared with the corresponding translated language preference data fields in the identity item of the requested translating user 106 or a plurality of requested translating users in Translating User Database 414.

The language editor module 408 is configured for receiving, storing, retrieving and updating a plurality of language editing interface items and corresponding input areas to be chosen or filled in by translating user 106 while translating the media metadata 326 and a plurality of other metadata of each learning application 300. In some embodiments, all linguistic content including textual content, and spoken word content of the learning application 300 may be accessed by each translating user 106 within a language editing interface generated by translation interface generator 424 by accessing the same from a learning application metadata module in the modular learning system 144 as well as by accessing the language editing interface items from module 408 and displaying the same to the translating user 106 on the user 106's user device 140. The language editor 408 may further include a word processing module wherein each translating user 106 may fill in a plurality of Unicode characters in the language requested for translation and, optionally, link the same to the original Unicode characters, words, sentences or paragraphs filled in for an authoring user 104's reference.

The Unicode character database 410 is configured for receiving, storing, retrieving and updating a plurality of Unicode characters for each language in language database 406 as well as a plurality of other Unicode characters like symbols and other characters along with their corresponding metadata in a plurality of data fields. The Unicode character database 410 is accessed by language editor module 408 and translation interface generator 424 to retrieve and display a plurality of Unicode characters filled in by translating user 106 in the appropriate input areas through the language editing interface on translating user 106's user device 140.

The Learning Application Authoring User Database 412 is configured for receiving, storing, retrieving and updating a plurality of data items for each of a subset of learning application authoring users requesting translation of a given application at any given time through the translation management module 242, by accessing the same from the corresponding identity items of the authoring users in the user database 202 of the modular learning system 144.

The Translating User Database 414 is configured for receiving, storing, retrieving and updating a plurality of data items for each of a subset of translating users translating a given application at any given time through the translation management module 242, by accessing the same from the corresponding identity items of translating users in the user database 202 of the modular learning system 144.

The transaction processor 416 is configured for processing and updating the account balance of the learning application authoring user 104 and translating user 106, when a translation fee is required and, optionally, entered in by translating user 106 for the translation service. In some embodiments, the language metadata, language compatibility as well as the translation badge for the translation item and corresponding request may not proceed to be updated or generated by the translation management module 242 until the transaction is confirmed by learning application authoring user 104 and processed by transaction processor 416.

The translation history module 418 is configured for generating, temporarily storing, retrieving and updating a plurality of version history items and corresponding edit inputs received from the translating user 106 for the corresponding edit inputs received for each translation item during the translation of the media metadata and other metadata of each learning application 300. Also, the module 418 temporarily stores the learning application 300's translated and, optionally, edited language metadata and other metadata content as received and edited by learning application translating user 106 during one or a plurality of translation sessions. In some embodiments, the metadata content is stored automatically at predetermined intervals of time, while in other embodiments; the updated or edited metadata content may be stored and updated upon request from user 106. In some embodiments, the module 418 may automatically assign a higher version of the edits received to a translation item and corresponding learning application 300 in one translating session as determined by the authentication module 422. In other embodiments, the translating user 106 may manually update the version number of the translation item for the learning application 300 by choosing or filling in the same through a version management interface generated by translation interface generator 424 on translating user 106's user device 140. In various embodiments, the learning application authoring user 104 may access the version history of the translation of the learning application by translating user 106 optionally, with the translating user 106's authorization through a learning application publishing management interface generated by a learning application publishing module in modular learning system 144, with the version history displayed to the authoring user 104 on user 104's user device 140.

The translation badge generator 420 is configured for accessing the Translating User Database 414 or, optionally, requesting the translation interface generator 424 to generate a translation fee interface item with a corresponding input area to be chosen or filled in by translation user 106 to determine the translation fee for the translation service provided to learning application authoring user 104. In some embodiments, the badge generator 420 retrieves the translation fee for the translation from the corresponding identity items of the translating user 106 from Translating User Database 414. In other embodiments, the badge generator 420 receives the fee requirement status and fee amount as inputs received from the translating user 106 through the interface generated by generator 424 and displayed on user 106's user device 140. In embodiments, wherein the translation fee is not required to be paid by the learning application authoring user in any of the above cases, the badge generator 420 directly proceeds to generate a unique translation badge interface item for the learning application 300 with a plurality of particulars like the name of the translating user 106, the date and timing of the translation, the edition of the learning application translated, an optional unique identification code of the learning application translated and, optionally, a plurality of other data items present in the plurality of data fields of the unique translated items of the translation in module 402. Although, the translation badge is described as being composed of various particulars, fewer or more particulars (e.g., Translation History, Version Number) may comprise the badge with the present invention still falling within the scope of various embodiments. Optionally, the translation badge may also include a timestamp of the translation.

The authentication module 422 is configured for authenticating the translating user 106 when the user requests access to the translation management interface generated by generator 424 on the modular learning system 144. In some embodiments, the module 422 requests generator 424 to generate translating user credentials interface with corresponding input areas to be filled in with login credentials by the translating user 106, and may request generator 424 to display the same to user 106 on user 106's user device 140. The module 422 compares the credential inputs and preferred user role received from the translating user 106 through the credentials interface and compares the same with the corresponding credentials preferences of the translating user by accessing the same in the Translating User Database 414. In embodiments, wherein the credentials received match the stored credentials preferences, authentication module 422 authorizes translation interface generator 424 to display a learning application translation management interface to the requesting translating user 106 on the translating user 106's user device 140. When the credentials received do not match the credentials preferences stored in database 414, the authentication module 422 does not authorize translation interface generator 424 to display the translation management interface and instead requests translation interface generator 424 to generate and display a translation management access denied interface item through an interface on user 106's user device 140.

The translation interface generator 424 is configured for generating a plurality of translation management interface items and corresponding input areas to be chosen or filled in by each translating user 106 during the translation of one or a plurality of learning applications requested by one or a plurality of learning application authoring users present in Learning Application Authoring User Database 412. In various embodiments, the translation interface generator 424 may access a plurality of data items from a plurality of other modules in the translation management module 242, and generate the corresponding interface items before display to the translating user 106 through a translation management interface. The translation interface generator 424 displays the interface items through a translation management interface to each translating user 106 on the translating user 106's user device 140.

Although the learning application translation management module is described as being composed of various modules, fewer or more modules (e.g., Learning Application Metadata Module, Learning Application Database, Translation Compatibility Module) may comprise the module, with the present invention still falling within the scope of various embodiments.

Figure 5:
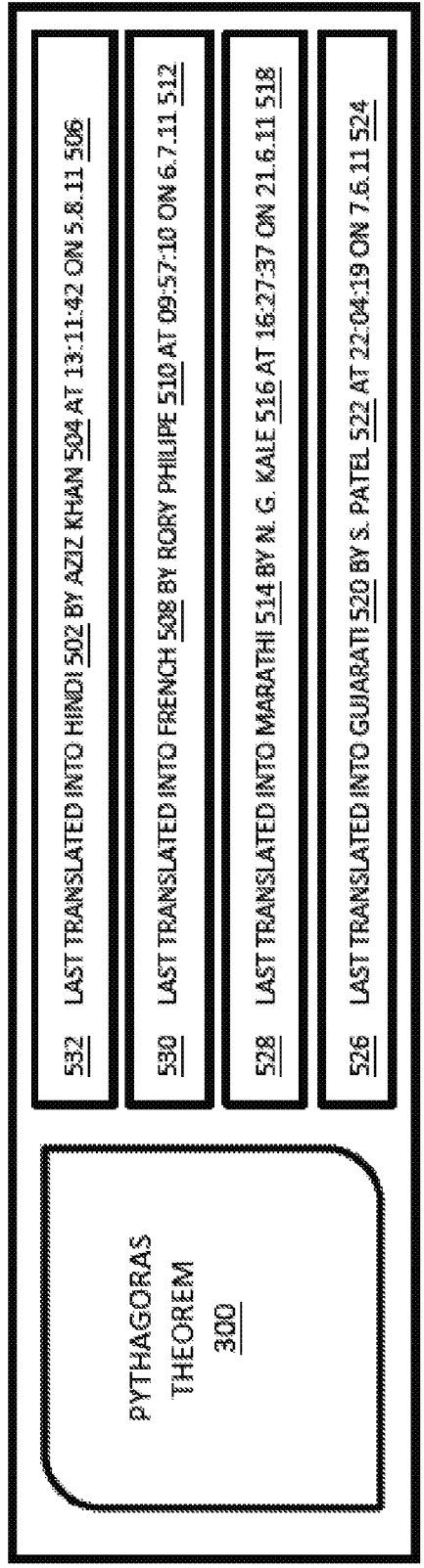
FIG. 5 is an illustration of a learning application translation history according to one embodiment.

FIG. 5 is an illustration 500 of a learning application 300's translation history according to one embodiment. The learning application 300, in this case a Pythagoras theorem exercise praxis application, is authored by learning application authoring user 104 and requested to be translated by a plurality of translating users such as S. Patel 522, N. G. Kale 516, Rory Philipe 510 and Aziz Khan 504 as well as, optionally, a plurality of other translating users like I. M. Iyer in Tamil and J. Mourinho in Spanish present in the Translating User Database 414 of the translation management module 242. The learning application is translated by into Gujarati 520 by S. Patel 522 on 7.6.11 at 22:04:19 and the corresponding translation timing item 524 is generated by module 404 for the translation. Similarly, the application 300 is translated into Marathi 514 by N. G. Kale 516 on 21.6.11 at 16:27:37 and the corresponding translation timing item 518 is generated by module 404 for the translation. Similarly, the application 300 is translated into French 508 by Rory Philipe 510 on 6.7.11 at 09:57:10 and the corresponding translation timing item 512 is generated by module 404 for the translation. Similarly, the application 300 is translated into Hindi 502 by Aziz Khan 504 on 5.8.11 at 13:11:42 and the corresponding translation timing item 506 is generated by module 404 for the translation. The corresponding translation badges 526, 528, 530 and 532 are generated by translation badge generator 420 and displayed to learning users from database 202 on the modular learning system 144 who have already purchased or performed the learning application 300 or wish to purchase the learning application 300 from a microlearning marketplace of the modular learning system 144, through interfaces generated by a learning user library interface generator and corresponding microlearning purchase management module 238's interface generator respectively. The language preferences 520, 524, 508 and 502 are accessed from language database 406, with the corresponding Unicode characters for the languages retrieved and displayed upon inputs by the users 522, 516, 510 and 504 respectively in language editing interfaces generated by generator 424 on the users' user devices 140.

Figure 6:
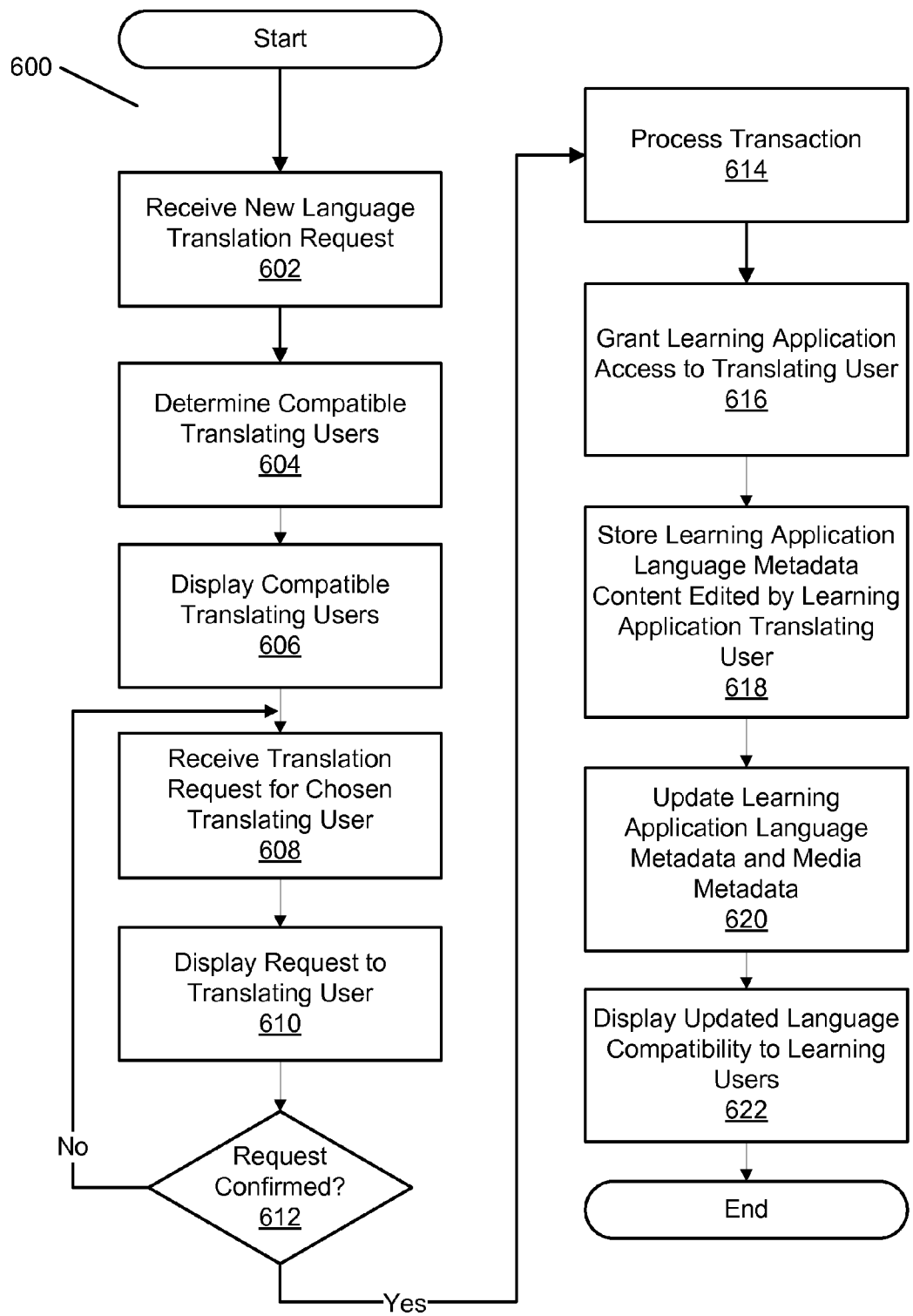
FIG. 6 is a flow diagram of a method for translation of learning applications in a modular learning system environment according to one embodiment.

FIG. 6 is a flow diagram 600 of a method for translation of learning applications in a modular learning system environment according to one embodiment. At step 602, the learning application translation management module 242 receives a translation request from a learning application authoring user, say user 104. At step 604, the learning application translation management module 242 requests the translation items module 402 to generate a unique translation item for the translation request based on the requested language of translation as well as optionally, a plurality of other request related data items received from the learning application authoring user 104. The learning application translation management module 242 then determines the compatibility of a subset of the plurality of translating users in Translating User Database 414 whose translated language preference data fields match the language preference items in database 406 by using language database 406, Translating User Database 414 and, optionally, a translation compatibility module in the module 242. In some embodiments, a plurality of other preference items modules may be accessed, optionally, by the translation compatibility module along with the corresponding preference items data fields in database 414 to determine compatibility of translating users to the translation request, with the present invention still falling within the scope of various embodiments (e.g., if the unique translation items of the translation request from the authoring user 104 indicates a preference for translating users whose translated language preferences include Hindi and whose translated subject preferences include Biology, then the translation compatibility module may determine the subset of translating users in database 414 whose profile matches the plurality of such preferences only). In other embodiments, the translation compatibility module may, based on preferences of authoring user 104 determine compatible translating users to a plurality of metadata of the learning application 300 requested to be translated, with the present invention still falling within the scope of various embodiments.

At step 606, an interface of a learning application publishing management module retrieves the identity items of the compatible translating users from database 414, generates the corresponding interface items and displays the same to the learning application authoring user 104 on user 104's user device 140. At step 608, the publishing management module in the modular learning system 144 receives a translation request for a selected translating user, say user 104, and the translation items module 402 in module 242 generates a translation item for the request and stores the same in module 402 itself. At step 610, the translation interface generator 424 displays the particulars of the request along with the corresponding interface items and, optionally, a request confirmation input area generated by generator 424 to the requested translating user, say user 106, on the user 106's user device 140.

At step 612, the module 242 receives a request confirmation or request denial input from the requested translating user 106 as chosen in the corresponding input area generated and displayed by generator 424 through a translation management interface on user 106's user device 140. In embodiments, wherein the request is denied, the translation management module 242 does not request learning application metadata module on the modular learning system 144 to grant access to the language metadata 306 and, optionally a plurality of other metadata of the learning application 300 in a language editing interface generated by generator 424 and displayed to the translating user 106 on user 106's user device 140. In some embodiments, the particulars of the request may further include particulars of other translations received by the learning application from other translating users on the modular learning system 144.

At step 614, in embodiments, wherein a translation fee is required and, optionally, entered in by translating user 106 for the translation service, the transaction processor 416 processes the transaction and updates the account balance of the learning application authoring user 104 and translating user 106. In such embodiments, the language metadata, language compatibility as well as the translation badge for the translation item and corresponding request may not proceed to be updated or generated by the translation management module 242 until the transaction is confirmed by learning application authoring user and processed by transaction processor 416. In other embodiments, wherein the translation fee is not required, the generator 424 directly proceeds to grant learning application metadata access to the translating user 106 through a language editing interface generated by the generator 424 and displayed to user 106 on user 106's user device 140.

At step 616, in embodiments, wherein the translation request is confirmed by the translating user 106 through the corresponding input preferences chosen through the interface, the translation management module 242 accesses language metadata 306 and other translatable metadata like media metadata 326, error metadata 332 and other metadata of the learning application 300 from a learning application metadata module in the modular learning system 144 and displays the same to the translating user through a language editing interface with corresponding interface items and input areas to be chosen or filled in by user 106 on the user 106's user device 140. At step 618, the translation history module 418 temporarily stores the learning application 300's translated and, optionally, edited language metadata and other metadata content as received and edited by learning application translating user 106 during one or a plurality of translation sessions. In some embodiments, the metadata content is stored automatically at predetermined intervals of time, while in other embodiments the updated or edited metadata content may be stored and updated upon request from user 106.

At step 620, the translation items module 402 updates the plurality of translated metadata in language metadata 306 of the learning application 300 in the corresponding metadata field of application 300 in the learning application metadata module of the modular learning system 144 by accessing the same from the updated metadata content stored in module 418 for the translation item of the translation request. In some embodiments, wherein the learning application authoring user 104 while publishing or updating the learning application with the translated content received from translating user 106 wishes to review the translated content in the language metadata of the learning application 300, an additional step of accessing the translation item in translation items module 402 and translation history module 418 may occur, with the learning application translation management module not authorized to update the learning application language metadata and, optionally, other metadata in the learning application metadata module of system 144 until such a confirmation is received from user 104 through a learning application publishing management module in system 144.

At step 622, the translation badge generator 420 proceeds to generate a unique translation badge interface item for the learning application 300 with a plurality of particulars like the name of the translating user 106, the date and timing of the translation, the edition of the learning application translated, an optional unique identification code of the learning application translated and, optionally, a plurality of other data items present in the plurality of data fields of the unique translation item of the translation request. The translation badge interface item for the unique translation item is accessed by a learning user library interface generator and a learning marketplace interface generator, and the learning application 300's unique interface item is updated with the badge interface item in a plurality of libraries of a plurality of learning users from database 202 who have already purchased or performed the learning application 300 as well as in a microlearning marketplace module of the modular learning system 144. Further, the language compatibility of the learning application 300 is also updated with the translated language in a learning application database of the modular learning system 144.

Although the steps illustrated in the method herein occur in the chronology of an embodiment, other embodiments may involve a different chronology of the steps (e.g., the transaction being processed after the translation is received and approved) with the present invention still falling within the scope of various embodiments. Although the method for translation of learning applications in a modular learning system environment is described as being composed of various steps, fewer or more steps (e.g., Generate Translation Badge Interface Item, Display Translation Fee To Learning Application Authoring User, Receive Translation Confirmation From Authoring User) may comprise the method, with the present invention still falling within the scope of various embodiments.

Computing Machine Architecture

Figure 7:
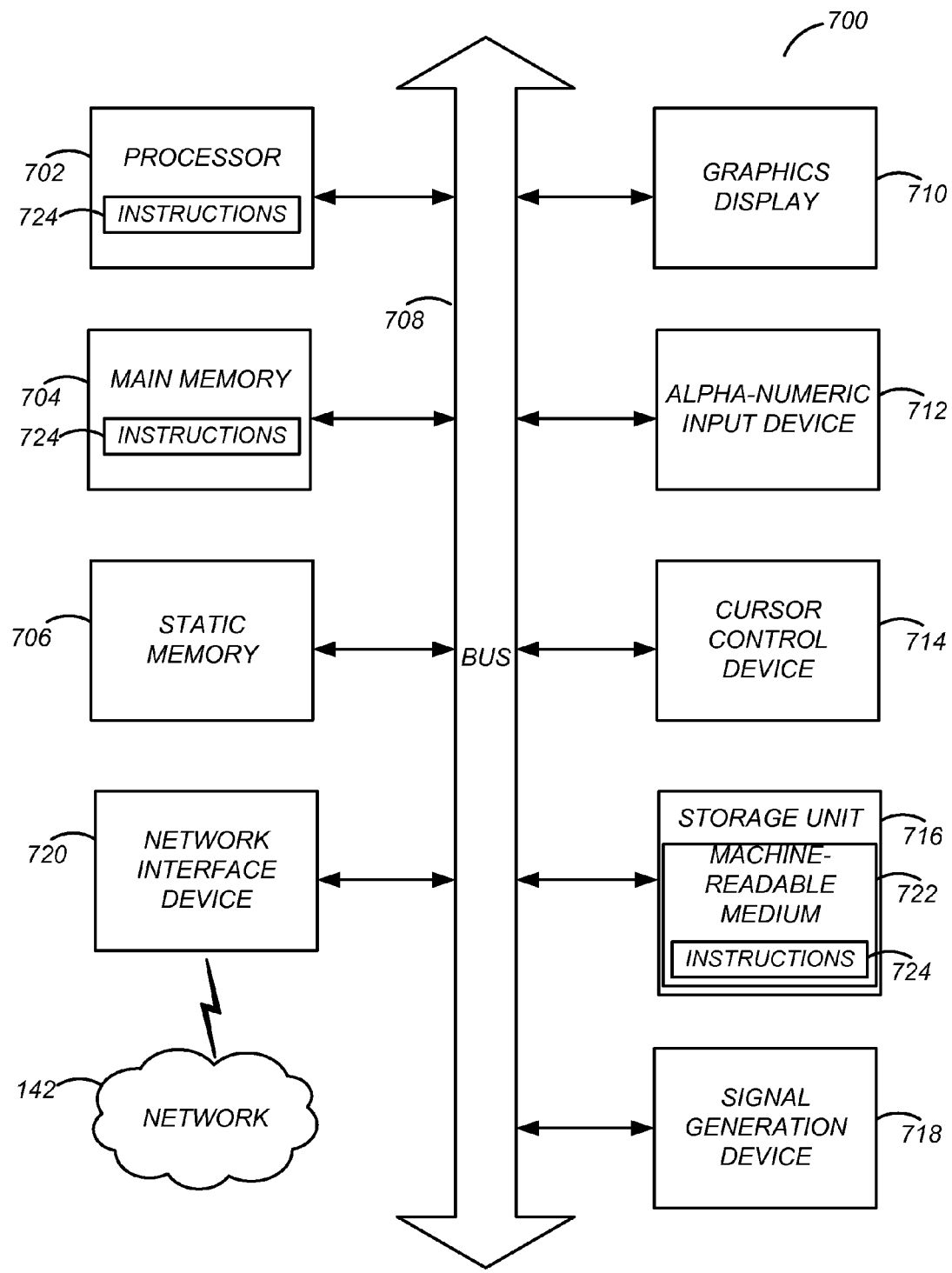
FIG. 7 is illustrates modules of an example machine able to read instructions from a machine-readable medium and execute them in a processor (or controller) according to one embodiment.

FIG. 7 is a block diagram illustrating modules of an example machine suitable for use as a modular learning system 144, in which any of the embodiments disclosed herein may be performed, according to one embodiment. This example machine is able to read instructions from a machine-readable medium and execute them in a processor (or controller).

Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include a graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface 720, which also are configured to communicate via the bus 708.

The storage unit 716 includes a machine readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 142 via the network interface device 720.

While machine readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

The modular learning system 144 may be one or more servers in which one or more methods disclosed herein are performed. The processor 702 may be a microprocessor, a state machine, an application specific integrated circuit, a field programmable gate array, etc. (e.g., Intel® Pentium® processor). The main memory 704 may be a dynamic random access memory and/or a primary memory of the modular learning system 144. The static memory 706 may be a hard drive, a flash drive, and/or other memory information associated with the modular learning system 144.

The bus 708 may be an interconnection between various circuits and/or structures of the modular learning system 144. The video display 710 may provide graphical representation of information on the modular learning system 144. The alphanumeric input device 712 may be a keypad, keyboard and/or any other input device. The cursor control device 714 may be a pointing device such as a mouse.

The storage unit 716 may be a hard drive, a storage system, and/or other longer term storage subsystem. The signal generation device 718 may be a bios and/or a functional operating system of the modular learning system 144. The network interface device 720 may be a device that may perform interface functions such as code conversion, protocol conversion and/or buffering required for communication to and from a network (e.g., the network 142 of FIG. 1). The machine readable medium 722 may provide instructions 724 on which any of the methods disclosed herein may be performed. The instructions 724 may provide source code and/or data code to the processor 702 to enable any one/or more operations disclosed herein. For example, the modular learning system 144 may be stored in the form of instructions 724 on a storage medium such as the main memory 704 and/or the machine readable medium 722 such as compact disk.

In one embodiment non-transitory computer readable storage medium having tangibly embodied thereon a program of instructions executable by a processor or a computing device (e.g., the modular learning system 144) causes the computing device to perform method steps illustrated in FIG. 6.

Additional Configuration Considerations

As an example, the modular learning system allows the authoring user of a mathematics learning application to request a translating user to translate the mathematics application into another language. The written and spoken portions of the instructions and other media associated with the learning application are provided to the translating user for translation into the desired language. The modular learning system may also suggest appropriate translating users for the learning application by identifying the translating users who are proficient at the original language and the desired translation language. Translating users may also identify a learning application in need of translation and offer translation services, for example, for a flat fee or for a portion of the sales of the translated version. The modular learning system may also calculate a translation productivity score for the particular learning application. The translation productivity score may be based, for example, on the translator's experience with translating particular languages, whether learners using the translator's translations tend to score above or below average, and whether the translator is proficient at the subject matter or, more granularly, the specific learning application. For certain learning applications, the translating user may be required to score a satisfactory score on the learning application before being allowed to provide a translation of the material.

Throughout this specification, plural instances may implement modules, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate modules in example configurations may be implemented as a combined structure or module. Similarly, structures and functionality presented as a single module may be implemented as separate modules. These and other variations, modifications, additions, and improvements fall within the scope of the subject matter herein.

Certain embodiments are described herein as including functionality implemented in computing logic or a number of modules, components, or mechanisms, for example, as illustrated in FIGS. 2, 4, and 5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

In another embodiment, the microlearning purchase and performance interface provided by the modular learning system 144 can be accessed over a local area network, intranet or virtual private network accessible to a limited plurality of user devices at a preschool, school, college, university, educational board, professional standards authority, coaching class, a company, HR department, training department or at a training organization through a user device.

In another embodiment, the microlearning purchase and performance interface provided by the modular learning system 144 can be accessed over a wide area network, General Packet Radio Service network, an Enhanced Data for Global Evolution network, a 3G telecommunications network, a 4G LTE telecommunications network or other telecommunications network through a user device.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although the present embodiments have been described with reference to specific example embodiments, it will be evident that various modifications and changes may be made to these embodiments without departing from the broader spirit and scope of the various embodiments. For example, the various devices, modules, databases, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine modules that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and modules of the embodiments herein. This is done merely for convenience and to give a general sense of the invention. This description should be read to include one or at least one and the singular also includes the plural unless it is obvious that it is meant otherwise.

According to the embodiments described in FIG. 1 through 6, various methods and electric structures may be embodied using transistors, logic gates, and electrical circuits (e.g., Application Specific Integrated Circuitry and/or in Digital Signal Processor circuitry). For example, the purchase management module 238, performance management module 240 and other modules of FIGS. 1 to 6 may be enabled using a purchase management circuit, a performance management circuit, and other circuits using one or more of the technologies described herein. In addition, it will be appreciated that the various operations, processes, and methods disclosed herein may be embodied in a machine-readable medium and/or a machine accessible medium compatible with a data processing system (e.g., a server) and may be performed in any order. Accordingly, the specification and drawings are to be regarded in an illustrative rather than a restrictive sense.

Upon reading this disclosure, those of skill in the art will appreciate still additional alternative structural and functional designs for a system and a process for managing the purchase and performance of learning applications and associated application services in a microlearning stack through the disclosed principles herein. Thus, while particular embodiments and applications have been illustrated and described, it is to be understood that the disclosed embodiments are not limited to the precise construction and modules disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for translation of a learning application, the method comprising steps of:
   receiving a new language translation request from a user device operated by a learning application authoring user; determining, from a database of translating users, a set of translating users compatible with the new language translation request;
   providing, for display to the user device, a set of translating users;
   receiving a selected translating user from the set of translating users;
   providing for display to a second user device operated by the selected translating user, the new language translation request;
   granting learning application access to the selected translating user;
   providing a language editor to the second user device, the language editor including language metadata associated with the learning application;
   translating the language metadata associated with the learning application in the second user device to a translated language metadata;
   storing the translated language metadata received from the second user device;
   updating the language metadata associated with the learning application with the translated language metadata; and
   providing a translated application based on the translated language metadata for display to the user device operated by a learning user.

2. The computer-implemented method of claim 1, wherein the language metadata translated by a translating user includes media metadata wherein said metadata includes textual and spoken word content.

3. The computer-implemented method of claim 1, further comprising generating a translation badge reflecting a translator and metadata about the translation, wherein said translation badge includes a timestamp of the translation.

4. The computer-implemented method of claim 1, further comprising providing for display to the user device, a translated language metadata content and receiving an approval from the learning application authoring user prior to updating the language metadata.

5. The computer-implemented method of claim 1, wherein the set of translating users compatible with the new language translation request is determined based in part on a preferred language associated with the new language translation request and a set of language proficiencies associated with each translating user in the database of translating users.

6. A non-transitory computer readable storage medium having tangibly embodied thereon a program of instructions executable by a processor for translation of learning applications in a modular learning system environment, instructions when executed causing the processor to perform steps of:
   receiving a new language translation request from a user device operated by a learning application authoring user; determining, from a database of translating users, a set of translating users compatible with the new language translation request;
   providing, for display to the user device, a set of translating users;
   receiving a selected translating user from the set of translating users;
   providing for display to a second user device operated by the selected translating user, the new language translation request;
   granting learning application access to the selected translating user;
   providing a language editor to the second user device, the language editor including language metadata associated with the learning application;
   translating the language metadata associated with the learning application in the second user device to a translated language metadata;
   storing the translated language metadata received from the second user device;
   updating the language metadata associated with the learning application with the translated language metadata; and
   providing a translated application based on the translated language metadata for display to the user device operated by a learning user.

7. The non-transitory computer readable storage medium of claim 6, wherein the language metadata translated by a translating user includes media metadata wherein said media metadata includes textual and spoken word content.

8. The non-transitory computer readable storage medium of claim 6 wherein the steps executed by instructions further comprises generating a translation badge reflecting a translator and metadata about the translation, wherein said translation badge includes a timestamp of the translation.

9. The non-transitory computer readable storage medium of claim 6, wherein the steps executed by instructions further comprises providing, for display to the user device, a translated language metadata content and receiving an approval from the learning application authoring user prior to updating the language metadata.

10. The non-transitory computer readable storage medium of claim 6, wherein the set of translating users compatible with the new language translation request is determined based in part on a preferred language associated with the new language translation request and a set of language proficiencies associated with each translating user in the database of translating users.

11. An apparatus comprising:
    a network interface configured for translation of learning applications in a modular learning system environment;
    a processor coupled to the network interface;
    a memory coupled to the processor, wherein the memory comprises instructions for execution on the processor to perform steps of:
       receiving a new language translation request from a user device operated by a learning application authoring user; determining, from a database of translating users, a set of translating users compatible with the new language translation request;
       providing, for display to the user device, a set of translating users;
       receiving a selected translating user from the set of translating users;
       providing for display to a second user device operated by the selected translating user, the new language translation request;
       granting learning application access to the selected translating user; providing a language editor to the second user device, the language editor including language metadata associated with the learning application;

translating the language metadata associated with the learning application in the second user device to a translated language metadata;

storing the translated language metadata content received from the second user device;

updating the language metadata associated with the learning application with the translated language metadata; and providing a translated application based on the translated language metadata for display to the user device operated by a learning user.

12. The apparatus of claim 11, wherein the language metadata translated by a translating user includes media metadata, wherein said media metadata includes textual and spoken word content.

13. The apparatus of claim 11, wherein the instructions further comprise a step of generating a translation badge reflecting a translator and metadata about the translation, wherein said translation badge includes a timestamp of the translation.

14. The apparatus of claim 11, wherein the instructions further comprise the steps of providing, for display to the user device, a translated language metadata content and receiving an approval from the learning application authoring user prior to updating the language metadata.

15. The apparatus of claim 11, wherein the set of translating users compatible with the new language translation request is determined based in part on a preferred language associated with the new language translation request and a set of language proficiencies associated with each translating user in the database of translating users.

* * * * *